United States Patent
Seyed Mousavi et al.

(10) Patent No.: US 11,899,881 B2
(45) Date of Patent: Feb. 13, 2024

(54) MACHINE LEARNING METHOD AND SYSTEM FOR SUPPRESSING DISPLAY INDUCED NOISE IN TOUCH SENSORS USING INFORMATION FROM DISPLAY CIRCUITRY

(71) Applicant: Apple Inc., Cupertino, CA (US)

(72) Inventors: Hojjat Seyed Mousavi, Santa Clara, CA (US); Nima Ferdosi, San Jose, CA (US); Baboo V. Gowreesunker, Mountain View, CA (US); Behrooz Shahsavari, Hayward, CA (US)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 17/123,015

(22) Filed: Dec. 15, 2020

(65) Prior Publication Data

US 2022/0019311 A1    Jan. 20, 2022

Related U.S. Application Data

(60) Provisional application No. 63/053,401, filed on Jul. 17, 2020.

(51) Int. Cl.
*G06F 3/041* (2006.01)
*G06N 3/08* (2023.01)
*G06F 18/25* (2023.01)

(52) U.S. Cl.
CPC .......... *G06F 3/0418* (2013.01); *G06F 18/251* (2023.01); *G06N 3/08* (2013.01)

(58) Field of Classification Search
CPC ........ G06F 3/0418; G06F 18/251; G06N 3/08
See application file for complete search history.

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| JP | 2000-163031 A | 6/2000 |
| JP | 2002-342033 A | 11/2002 |
| WO | 2017/151757 A1 | 9/2017 |

OTHER PUBLICATIONS

Aggarwal, C.C. (2018). An Introduction to Neural Networks. In: Neural Networks and Deep Learning. Springer, Cham. https://doi.org/10.1007/978-3-319-94463-0_1 (Year: 2018).*

(Continued)

*Primary Examiner* — Raymond L Nimox
(74) *Attorney, Agent, or Firm* — Kubota & Basol LLP

(57) ABSTRACT

In some examples, touch data can include noise. The noise can be generated by a component of an electronic device that includes a touch screen. For example, one or more signals transmitted to the display circuitry of an electronic device can become capacitively coupled to the touch circuitry of the device and cause noise in the touch data. Machine learning techniques, such as gated recurrent units and/or convolutional neural networks can estimate and reduce or remove noise from touch data when provided data or information about the displayed image as input. In some examples, the algorithm includes one or more of a gated recurrent unit stage and a convolutional neural network stage. In some examples, a gated recurrent unit stage and a convolutional neural network stage can be arranged in series, such as by providing the output of the gated recurrent unit as input to the convolutional neural network.

24 Claims, 12 Drawing Sheets

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 8,520,913 B2 | 8/2013 | Dean et al. | |
| 9,098,148 B2 | 8/2015 | Sharma | |
| 9,146,630 B2 | 9/2015 | Choi et al. | |
| 9,164,618 B2 | 10/2015 | Perski et al. | |
| 9,244,545 B2 | 1/2016 | Hinckley et al. | |
| 9,256,321 B2 | 2/2016 | Wang et al. | |
| 9,558,455 B2 | 1/2017 | Johnson et al. | |
| 9,904,412 B2 | 2/2018 | Stevenson et al. | |
| 10,261,685 B2 | 4/2019 | Deselaers et al. | |
| 10,345,970 B2 | 7/2019 | Qiao et al. | |
| 10,928,955 B1 | 2/2021 | Reed et al. | |
| 11,481,070 B1 | 10/2022 | Ganjali et al. | |
| 11,599,223 B1 | 3/2023 | Gowreesunker et al. | |
| 2006/0197753 A1 | 9/2006 | Hotelling | |
| 2006/0214921 A1 | 9/2006 | Takahashi et al. | |
| 2007/0257890 A1* | 11/2007 | Hotelling | G06F 3/04182 345/173 |
| 2012/0056846 A1 | 3/2012 | Zaliva | |
| 2012/0113064 A1* | 5/2012 | White | G06F 3/04184 345/178 |
| 2012/0194452 A1 | 8/2012 | Cho et al. | |
| 2012/0249433 A1 | 10/2012 | Deng et al. | |
| 2013/0222290 A1 | 8/2013 | Choi et al. | |
| 2014/0028621 A1* | 1/2014 | Hotelling | G06F 3/044 345/174 |
| 2014/0062949 A1 | 3/2014 | Chang et al. | |
| 2014/0071360 A1 | 3/2014 | Chang et al. | |
| 2014/0118297 A1 | 5/2014 | Huang et al. | |
| 2014/0204058 A1 | 7/2014 | Huang et al. | |
| 2014/0267132 A1* | 9/2014 | Rabii | G06F 3/04182 345/173 |
| 2015/0091850 A1 | 4/2015 | Morein et al. | |
| 2015/0242009 A1 | 8/2015 | Xiao et al. | |
| 2015/0293621 A1 | 10/2015 | Singh et al. | |
| 2016/0196003 A1 | 7/2016 | Yoon et al. | |
| 2016/0291792 A1 | 10/2016 | Sawahata et al. | |
| 2016/0309307 A1 | 10/2016 | Agarwal et al. | |
| 2016/0357315 A1 | 12/2016 | Huang et al. | |
| 2017/0003785 A1 | 1/2017 | Berget et al. | |
| 2017/0090668 A1* | 3/2017 | Agarwal | G06F 3/044 |
| 2017/0090670 A1 | 3/2017 | Stevenson et al. | |
| 2017/0139527 A1 | 5/2017 | Nathan et al. | |
| 2017/0192604 A1* | 7/2017 | Stevenson | G06F 3/0446 |
| 2017/0285804 A1* | 10/2017 | Li | G06F 3/041662 |
| 2018/0059852 A1 | 3/2018 | Sterling et al. | |
| 2018/0129311 A1* | 5/2018 | Westhues | G06F 3/04166 |
| 2018/0188938 A1 | 7/2018 | Deselaers et al. | |
| 2018/0329542 A1 | 11/2018 | Forlines et al. | |
| 2018/0348949 A1 | 12/2018 | Kim et al. | |
| 2019/0079634 A1* | 3/2019 | Kravets | G06F 3/0443 |
| 2019/0122076 A1 | 4/2019 | Sen et al. | |
| 2020/0142532 A1 | 5/2020 | Kravets et al. | |
| 2020/0210045 A1 | 7/2020 | Mohamed et al. | |
| 2020/0241691 A1 | 7/2020 | Kobayashi | |
| 2021/0191563 A1 | 6/2021 | Reed et al. | |
| 2021/0397327 A1* | 12/2021 | Lee | G09G 3/20 |
| 2023/0016448 A1 | 1/2023 | Ganjali et al. | |

OTHER PUBLICATIONS

Aggarwal, C.C. (2018). Recurrent Neural Networks. In: Neural Networks and Deep Learning. Springer, Cham. https://doi.org/10.1007/978-3-319-94463-0_7 (Year: 2018).*

Aggarwal, C.C. (2018). Convolutional Neural Networks. In: Neural Networks and Deep Learning. Springer, Cham. https://doi.org/10.1007/978-3-319-94463-0_8 (Year: 2018).*

Huy Viet Le et al., "Hand-and-Finger-Awareness for Mobile Touch Interaction using Deep Learning", University of Suttgart, Germany, 2019, 258 pages.

Final Office Action received for U.S. Appl. No. 16/107,037, dated Jan. 13, 2020, 17 pages.

Non-Final Office Action received for U.S. Appl. No. 16/107,037, dated Jul. 30, 2019, 15 pages.

Non-Final Office Action received for U.S. Appl. No. 16/107,037, dated May 6, 2020, 20 pages.

Notice of Allowance received for U.S. Appl. No. 16/107,037, dated Oct. 22, 2020, 9 pages.

Notice of Allowance received for U.S. Appl. No. 17/177,977, dated Nov. 4, 2021, 9 pages.

Lee et al., "A Multi-Touch Three Dimensional Touch-Sensitive Tablet", CHI'85 Proceedings, Apr. 1985, pp. 21-25.

Rubine, Dean, "Combining Gestures and Direct Manipulation", CHI'92, May 3-7, 1992, pp. 659-660.

Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

Non-Final Office Action received for U.S. Appl. No. 17/933,974, dated Mar. 2, 2023, 19 pages.

Ex Parte Quayle Action received for U.S. Appl. No. 17/249,791, mailed on Jan. 5, 2022, 8 pages.

Non-Final Office Action received for U.S. Appl. No. 17/249,791, dated Apr. 12, 2022, 12 Pages.

Notice of Allowance received for U.S. Appl. No. 17/249,791, dated Nov. 7, 2022, 11 pages.

Notice of Allowance received for U.S. Appl. No. 17/463,195, dated Jun. 10, 2022, 11 Pages.

Notice of Allowance received for U.S. Appl. No. 17/933,974, dated Aug. 21, 2023, 12 pages.

* cited by examiner

MACHINE LEARNING METHOD AND SYSTEM FOR SUPPRESSING DISPLAY INDUCED NOISE IN TOUCH SENSORS USING INFORMATION FROM DISPLAY CIRCUITRY

CROSS REFERENCE TO RELATED APPLICATIONS

This application claims the benefit of U.S. Provisional Patent Application No. 63/053,401 filed Jul. 17, 2020, the contents of which are incorporated herein by reference in their entirety for all purposes.

FIELD OF THE DISCLOSURE

This relates generally to mitigating noise present in touch data and, more specifically, to using machine learning to mitigate noise present in touch data sensed by a touch screen.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). In some implementations, due in part to their substantial transparency, some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

In some examples, touch data can include noise caused by one or more other components of the electronic device, such as the display, the power system, or other components. Noise can be mitigated by designing the electronic device such that the touch sensing system is shielded from the other components of the electronic device, for example. In some examples, however, such as for portable electronic devices, the addition of shielding materials can be undesirable.

BRIEF SUMMARY OF THE DISCLOSURE

Embodiments described herein relate generally to mitigating noise present in touch data and, more specifically, to using machine learning to mitigate noise present in touch data sensed by a touch screen. In some examples, the noise can be generated by a component of an electronic device that includes a touch screen. For example, one or more signals transmitted to the display circuitry of an electronic device can become capacitively coupled to the touch circuitry of the device and cause noise in the touch data.

In some examples, the electronic device can use machine learning techniques, such as gated recurrent units and/or convolutional neural networks to estimate and reduce or remove noise from touch data when provided data or information about the displayed image as input. The electronic device can use one or more processors included in a display chip and/or a touch chip to perform the machine learning method.

In some examples, the algorithm includes one or more of a gated recurrent unit stage and a convolutional neural network stage. In some examples, a gated recurrent unit stage and a convolutional neural network stage can be arranged in series, such as by providing the output of the gated recurrent unit as input to the convolutional neural network.

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Embodiments described herein relate generally to mitigating noise present in touch data and, more specifically, to using machine learning to mitigate noise present in touch data sensed by a touch screen. In some examples, the noise can be generated by a component of an electronic device that includes a touch screen. For example, one or more signals transmitted to the display circuitry of an electronic device can become capacitively coupled to the touch circuitry of the device and cause noise in the touch data.

In some examples, the electronic device can use machine learning techniques, such as gated recurrent units and/or convolutional neural networks to estimate and reduce or remove noise from touch data when provided data or information about the displayed image as input. The electronic device can use one or more processors included in a display chip and/or a touch chip to perform the machine learning method.

In some examples, the algorithm includes one or more of a gated recurrent unit stage and a convolutional neural network stage. In some examples, a gated recurrent unit stage and a convolutional neural network stage can be arranged in series, such as by providing the output of the gated recurrent unit as input to the convolutional neural network.

Figure 1A:
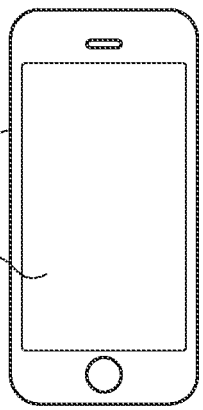
FIGS. 1A-1E illustrate example systems that can use noise removal techniques according to examples of the disclosure.
Figure 1B:
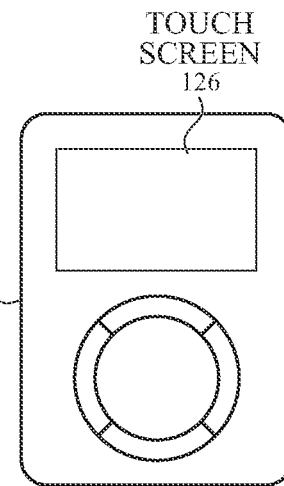
Figure 1C:
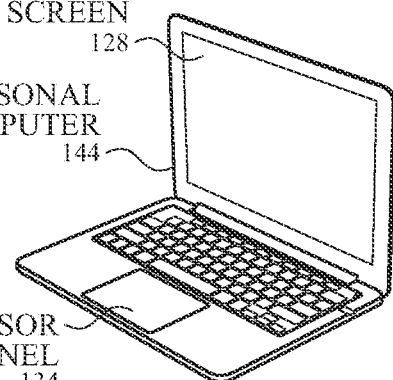
Figure 1D:
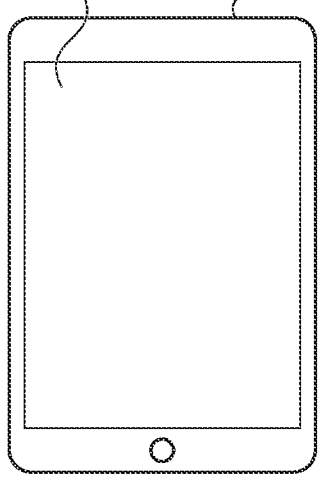
Figure 1E:
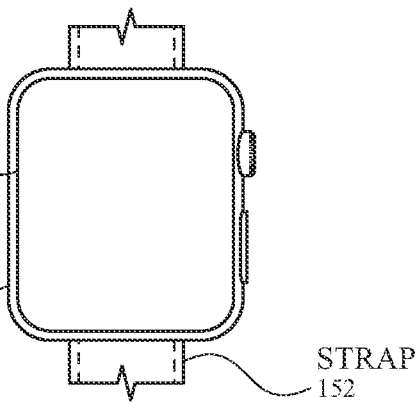

FIGS. 1A-1E illustrate example systems that can use noise removal techniques according to examples of the disclosure. FIG. 1A illustrates an example mobile telephone 136 that includes a touch screen 124 that can use noise removal techniques according to examples of the disclosure. FIG. 1B illustrates an example digital media player 140 that includes a touch screen 126 that can use noise removal techniques according to examples of the disclosure. FIG. 1C illustrates an example personal computer 144 that includes a touch screen 128 and a touch sensor panel 134 (e.g., a trackpad) that can use noise removal techniques according to examples of the disclosure. FIG. 1D illustrates an example tablet computing device 148 that includes a touch screen 130 that can use noise removal techniques according to examples of the disclosure. FIG. 1E illustrates an example wearable device 150 that includes a touch screen 132 and can be attached to a user using a strap 152 and that can use noise removal techniques according to examples of the disclosure. FIG. 1F illustrates an example remote control device 154 that includes a touch sensor panel 138 that can use glove touch detecting techniques according to examples of the disclosure. It is understood that a touch screen and noise removal techniques can be implemented in other devices, including future devices not yet in the marketplace. Additionally, it should be understood that although the disclosure herein primarily focuses on touch screens, the disclosure of noise removal techniques can be implemented for devices including touch sensor panels (and displays) that may not be implemented as a touch screen.

In some examples, touch screens 124, 126, 128, 130 and 132 and touch sensor panels 134 and 138 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen can include a plurality of individual touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 132 and touch sensor panels 134 and 138 can be based on mutual capacitance. A mutual capacitance based touch system can include electrodes arranged as drive and sense lines (e.g., as described below with reference to FIG. 4A) that may cross over each other on different layers (in a double-sided configuration) or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132 and touch sensor panels 134 and 138 can be based on mutual capacitance and/or self-capacitance. The electrodes can be arrange as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance there between and some of the electrodes can be configured to sense self-capacitance thereof.

Figure 2:
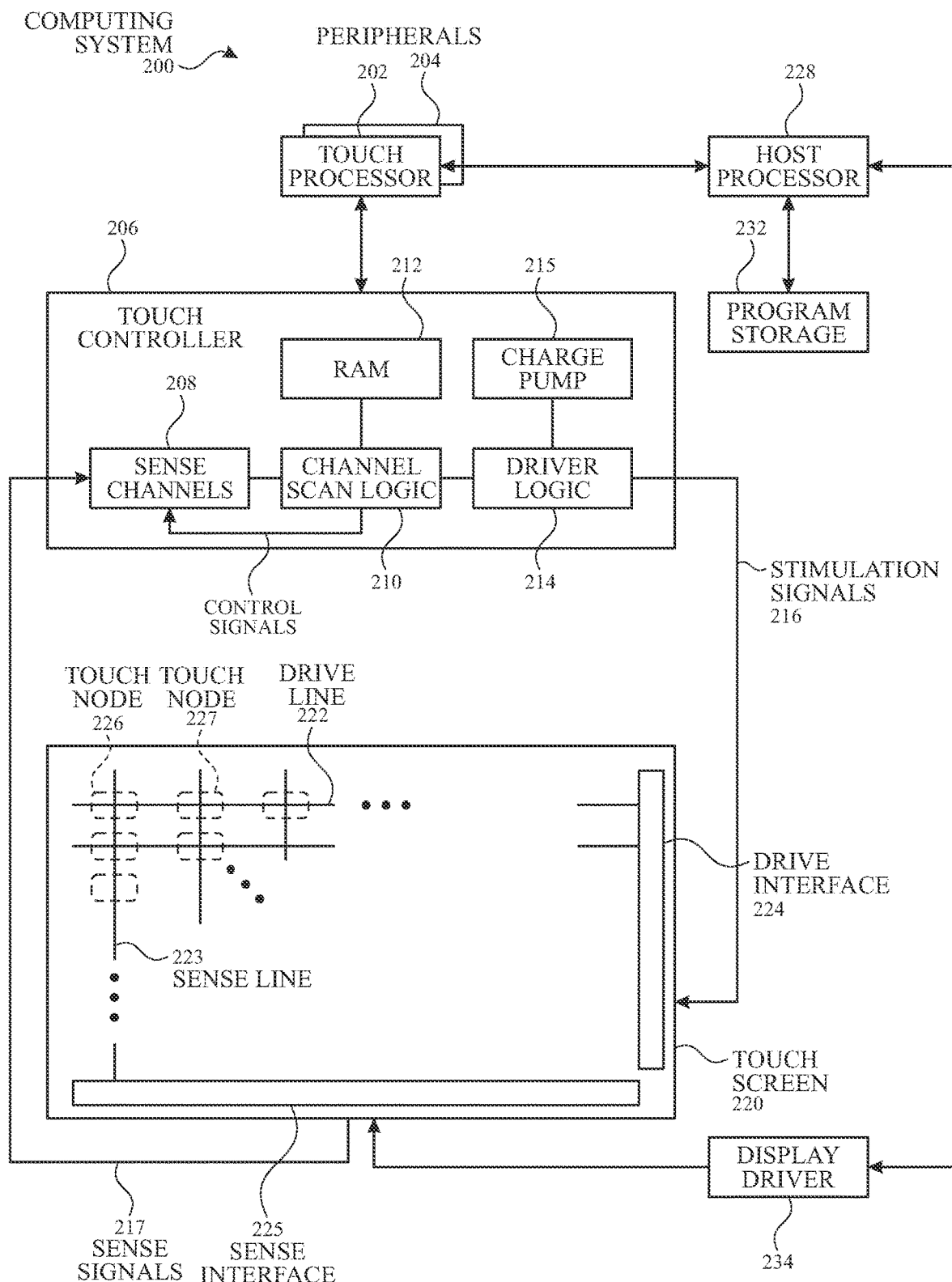
FIG. 2 illustrates an example computing system including a touch screen that can use noise removal techniques according to examples of the disclosure.

FIG. 2 illustrates an example computing system including a touch screen that can use noise removal techniques according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers, co-processor(s) and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, capturing an image with a camera in communication with the electronic device, exiting an idle/sleep state of the electronic device, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224 and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
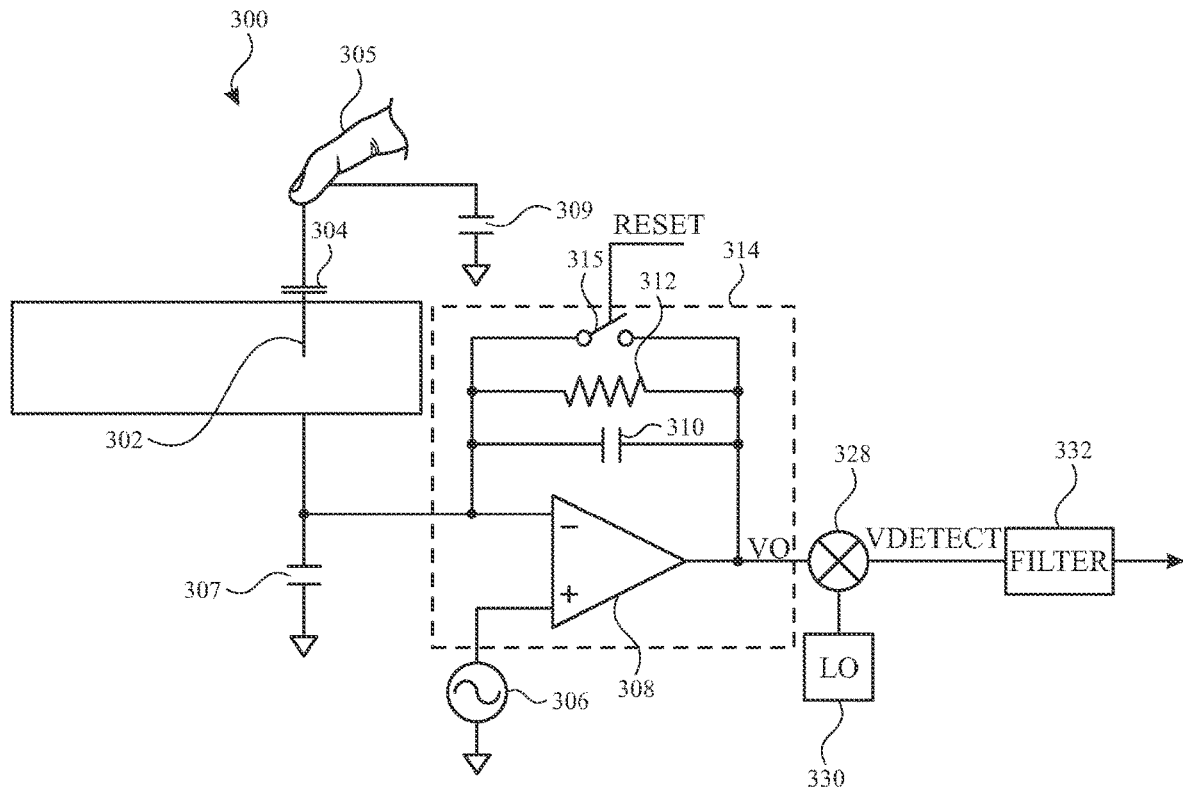
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 (e.g., corresponding to a sense channel 208) according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. Output 320 can be used by a processor to determine the presence of a proximity or touch event, or the output can be inputted into a discreet logic network to determine the presence of a proximity or touch event.

Figure 3B:
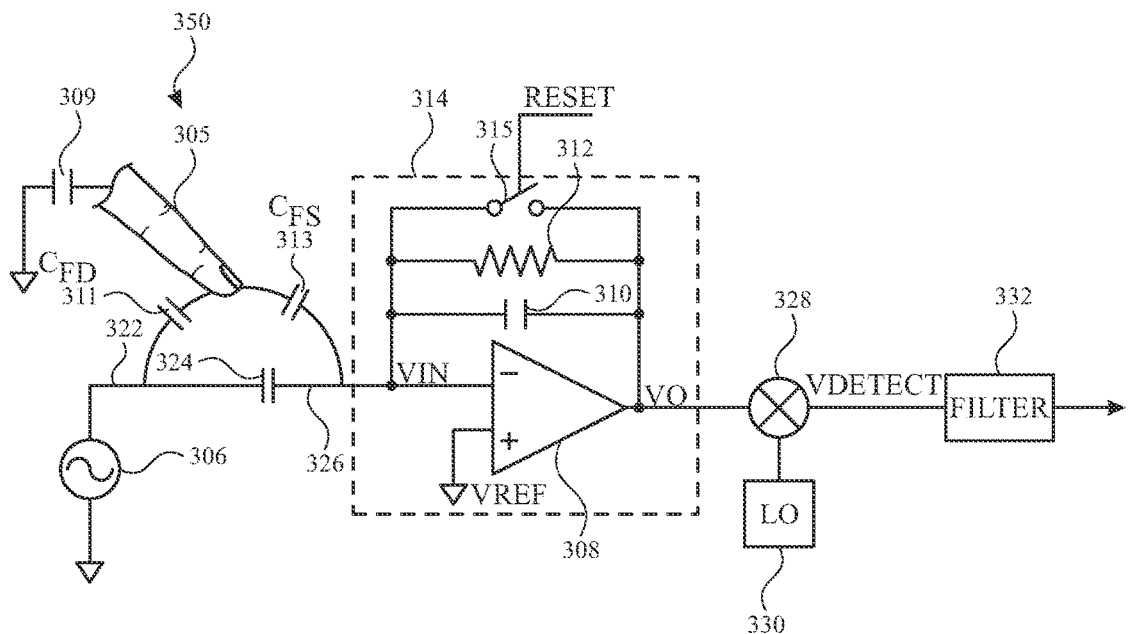
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as $V_{in}$) can be inputted into the inverting input of operational amplifier 308, and the non-inverting input of the operational amplifier can be coupled to a reference voltage $V_{ref}$. Operational amplifier 308 can drive its output to voltage $V_o$ to keep $V_{in}$ substantially equal to $V_{ref}$, and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred.

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
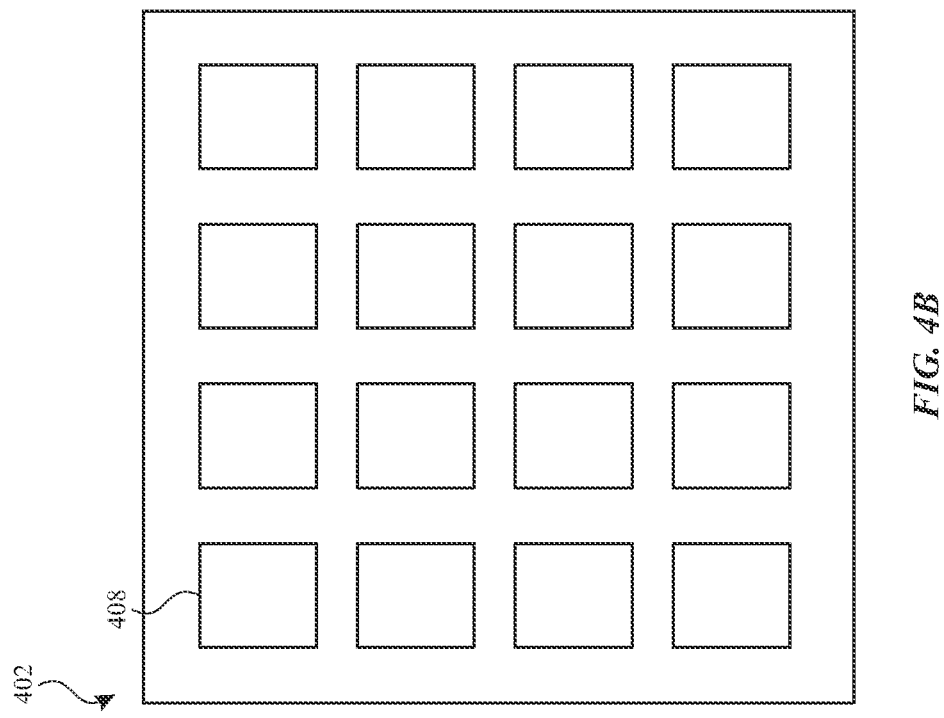
FIG. 4B illustrates touch screen with touch node electrodes arranged in a pixelated touch node electrode configuration according to examples of the disclosure.
Figure 4A:
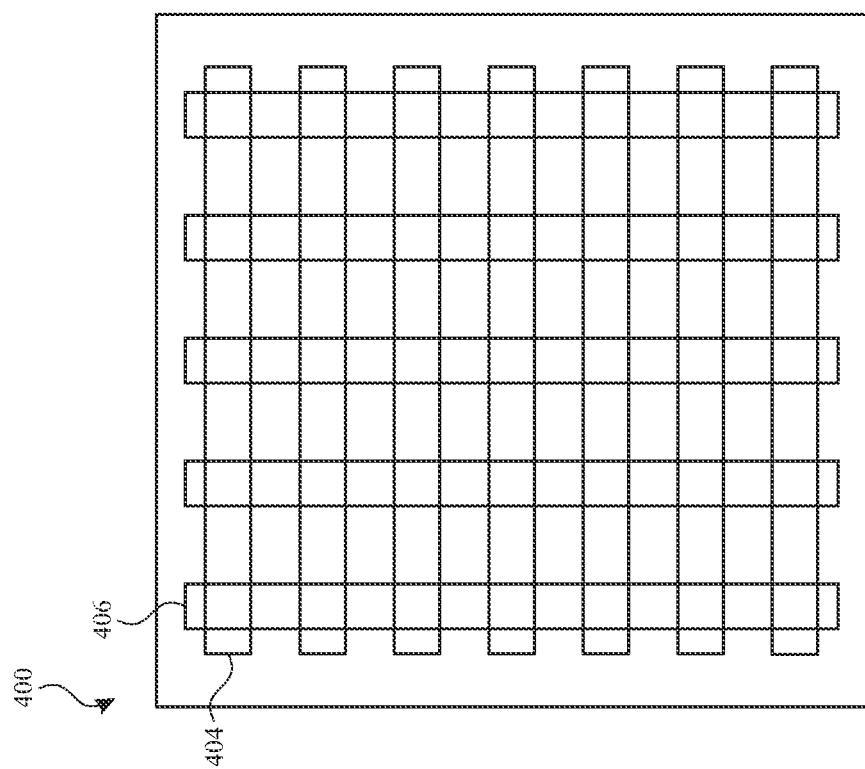
FIG. 4A illustrates touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400. Although the touch electrodes 404 and 406 are illustrated as being rectangularly-shaped, it should be understood that other electrode shapes and structures (e.g., diamond-, square-, stripe- or circle-shaped electrodes connected by jumpers or vias) are possible.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 402. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402. Although touch node electrodes 408 are illustrated as having rectangular shapes, it should be understood that other electrode shapes (e.g., diamonds, circles, stripes etc.) and structures are possible.

In some examples, a touch screen can concurrently display an image and detect objects touching or proximate to the surface of the touch screen. The electrical signals that an electronic device uses to display images on the touch screen can capacitively couple to the touch electrodes, creating noise in the touch data. Moreover, one or more additional components of the electronic device (e.g., a power system, one or more processors, etc.) can inject noise into the touch data. The electronic device can use the touch screen as an input device, such as by performing one or more functions in response to detecting input provided by the user at the touch screen. Thus, in some examples, when the noise in the touch data prevents the electronic device from accurately detecting the location, size, and shape of a touching or proximate object, user experience can suffer. Thus, it can be desirable to reduce the amount of noise present in the touch data to enable the electronic device to detect touching and proximate objects with improved accuracy.

Although some noise can be mitigated by providing insulating layers between the touch circuitry and other circuitry (e.g., display circuitry, power system circuitry, circuitry of one or more processors, etc.), adding insulation to the electronic device can increase the size of the electronic device, which can be undesirable for users, especially for portable electronic devices (e.g., mobile phones, media players, laptop computers, tablets, wearable devices, etc.). Thus, in some examples, data processing techniques can be used to remove the noise from the data before processing the detected touch and hover events.

In some situations, an electronic device includes a touch screen capable of sensing objects (e.g., user fingers, styluses, other conductive objects) proximate to the touch screen and capable of displaying one or more images. The touch screen can be an on-cell touch screen with display circuitry and touch circuitry stacked on top of one another. For example, the touch circuitry can include transparent materials, such as ITO, AZO, and the like overlaid on a display screen. In some examples, the touch screen can be an in-cell touch screen with the touch and display circuitry integrated together and sharing one or more electrical components (e.g., electrodes, gate lines, drive lines, etc.) in a time-multiplexed or other manner.

In some examples, due to the proximity of the touch circuitry and display circuitry, one or more display signals can be capacitively coupled to the touch circuitry. In some examples, the display circuitry acts as a noise source of the touch data. The noise from the display circuitry can include a stochastic (e.g., random) component and a deterministic component that is dependent on the image displayed by the display circuitry and/or the brightness of the display, for example. Thus, in some examples, it is possible to predict the deterministic display noise from display data, such as the image to be displayed and/or the brightness of the display.

Figure 5A:
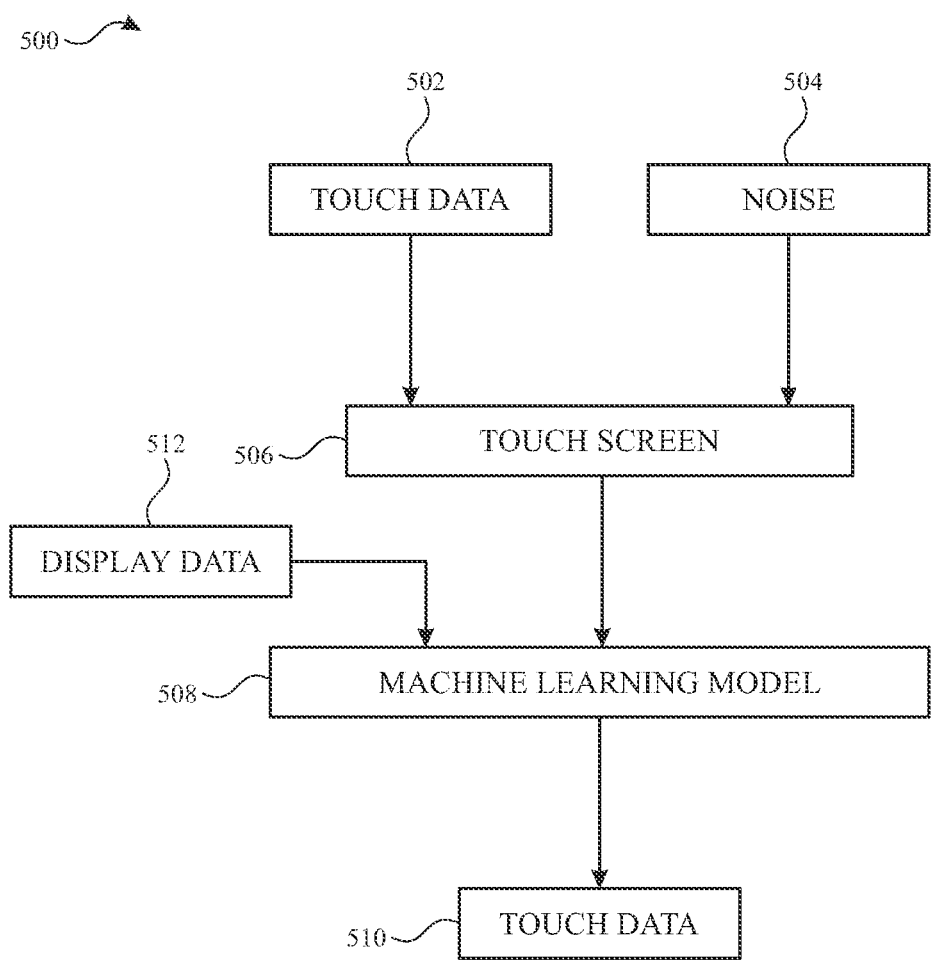
FIG. 5A illustrates an exemplary block diagram of a noise removal system according to some examples of the disclosure.

FIG. 5A illustrates an exemplary block diagram 500 of a noise removal system according to some examples of the disclosure. In some examples, a touch screen 506, which can be similar to or the same as one or more of touch screens 124, 126, 128, 130, 132, 220, 400, or 420 described above, can sense a signal that includes touch data 502 and noise 504. The touch screen 506 can be operatively coupled to a machine learning model 508 that can accept display data 512 as an input and can output touch data 510 with some or all of the noise 504 removed.

In some examples, the touch data 502 can represent the component of the signal sensed at the touch screen 506 that is representative of an object proximate to the touch screen. For example, touch data 502 can be the electrical signal produced in response to a change in capacitance caused by a proximate object according to one or more of the examples described above with reference to FIGS. 1-4.

In some examples, the noise 504 can include deterministic display noise. The noise 504 can be caused by a display signal applied to display circuitry that is located close enough to the touch circuitry of touch screen 506 that the display signal is capacitively coupled to the touch circuitry. For example, the display signal can be coupled to one or more touch electrodes (e.g., touch electrodes 302, 404, 406, and/or 408), drive lines (e.g., drive lines 222, 322), sense lines (e.g., 223, 326) or other touch circuitry component(s).

In some examples, the machine learning model 508 can predict noise 504, such as deterministic display noise from display data 512. Exemplary machine learning models 508 are described below with reference to FIGS. 6A-6E. As will be described in more detail below with reference to FIG. 5B, the machine learning model 508 can be stored on a display chip of the electronic device, on a touch chip of the electronic device, or partially stored on the display chip and partially stored on the touch chip.

As will be described in more detail below with reference to FIG. 5B, in some examples, the display data 512 can include one or more of display brightness, an image to be displayed by the touch screen 506, or one or more features of the image to be displayed by the touch screen 506.

In some examples, the touch data 510 output by the machine learning model 508 can be the difference between the combined touch data 502 and noise 504 sensed by the touch screen 506 and the noise estimated by the machine learning model 508. In some examples, the touch data 510 can be the touch data 502 with some, most, or all of the noise 504 removed.

Figure 5B:
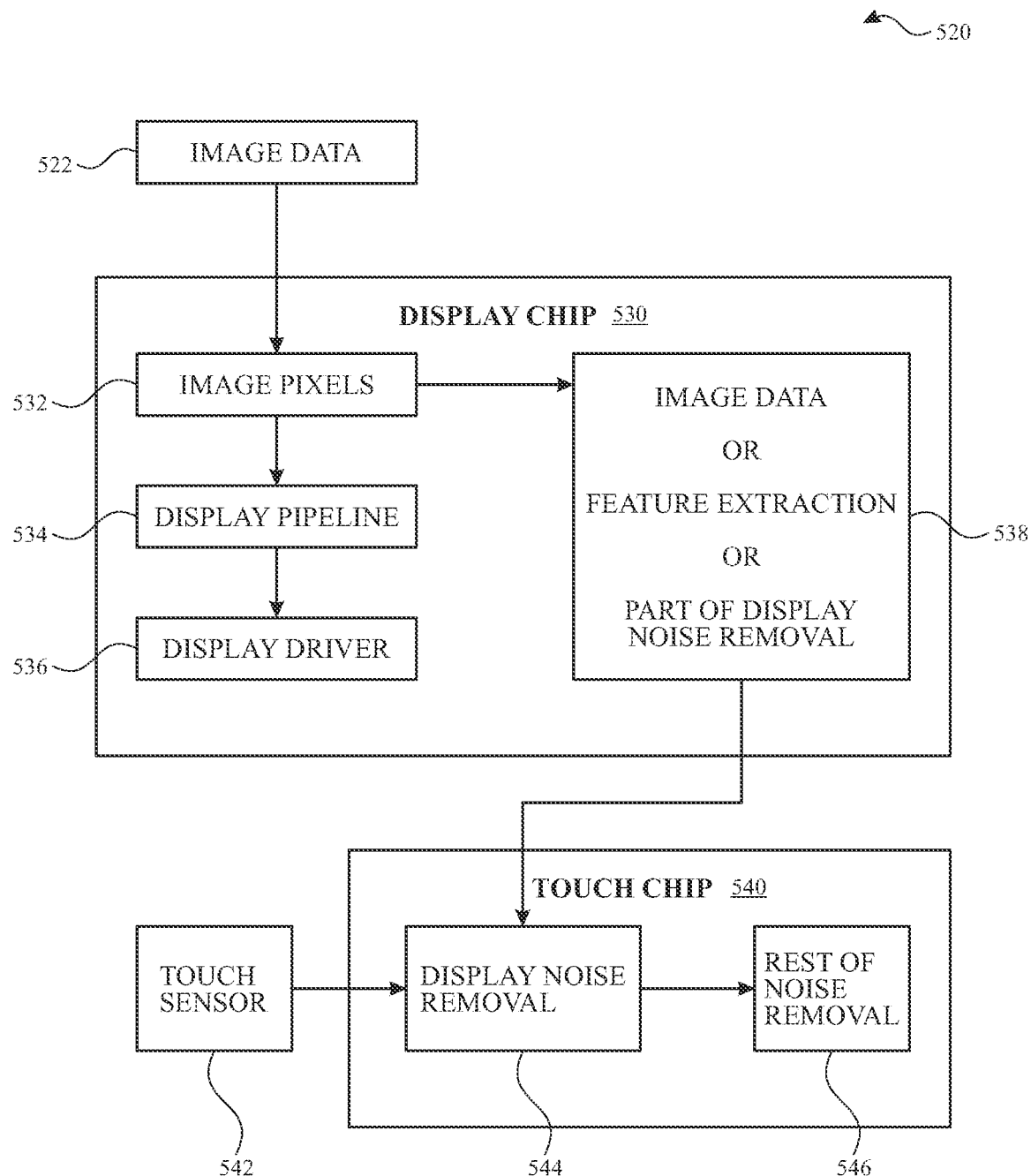
FIG. 5B illustrates a block diagram of an exemplary display chip and an exemplary touch chip of an electronic device in accordance with some examples of the disclosure.

FIG. 5B illustrates a block diagram 520 of an exemplary display chip 530 and an exemplary touch chip 540 of an electronic device in accordance with some examples of the disclosure. In some examples, the display chip 530 includes one or more processors storing instructions that cause the electronic device to display images on a touch screen or other display device. In some examples, the touch chip 540 includes one or more processors storing instructions that cause the electronic device to sense one or more objects proximate to or touching the touch screen or other touch-sensitive surface. In some examples, the touch chip 540 can be in communication with touch sensor 542, which can be a touch screen, touch sensor panel, or other touch sensor described herein.

In some examples, the display chip 530 receives image data 522, that corresponds to an image to be displayed by the touch screen of the electronic device. In some examples, the image data can include one or more signals with which the display pixels of the touch screen can be driven. For example, the image data includes signals for the red, blue, and green subpixels of each pixel in the pixel array of the touch screen.

In some examples, the display chip 530 can read the image data 522 and convert the image data into image pixels 532, which can be numeric representations of the color of each pixel in a respective image. In some examples, the image pixels 532 can be provided to the display pipeline 534, which can process the image pixels 532 to output image signals to the display driver 536. For example, the display pipeline converts the format of the image pixels 532 from the format provided by the image data 522 to a format that can used by the display driver 536. The display driver 536 can apply signals to the display pixels of the touch screen to display images on the touch screen.

In some examples, the image pixels 532 can also be provided to a processor 538 of the display chip 530 configured to communicate with the touch chip 540 to remove noise from the touch data, such as deterministic display noise. In some examples, the processor 538 receives the image pixels 532 and outputs image data (e.g., image pixels, display brightness, or other image data) to the touch chip 540 and the touch chip 540 performs the rest of the noise removal. In some examples, the processor 538 performs feature extraction on the image pixels 532. Feature extraction can include one or more of determining the brightness of each pixel in the image, determining the grayscale value of each pixel in the image, downsampling (e.g., by calculating a mean or median color, brightness, or greyscale value of groups (e.g., squares, rectangles, rows, columns) of pixels) the image to reduce the number of pixels in the image, or performing other manipulations of the image pixel 532 data to improve the speed, accuracy, complexity, or other performance metric of the noise removal algorithms performed by the touch chip 540. In some examples, processor 538 can perform some of the machine learning method for removing noise from the touch data, such as one of exemplary machine learning methods described below with reference to FIGS. 6A-6E.

In some examples, the touch chip 540 can include a processor 544 configured to remove noise caused by the display circuitry of the electronic device (e.g., deterministic display noise) and a processor 526 configured to remove other noise from the touch data. The touch chip 540 can be in communication with touch sensor 542, for example.

The touch sensor 542 can include one or more of the touch sensing components described above with reference to FIGS. 1A-4B, such as a touch screen including touch electrodes coupled to sense circuitry. The touch sensor 542 can generate one or more signals indicative of objects proximate to and/or touching the surface of the touch screen. As described above, the touch signals of the touch sensor can include noise, such as display noise (e.g., deterministic display noise, stochastic display noise) and noise from other sources (e.g., noise caused by other circuitry of the electronic device, parasitic capacitance, poor grounding of the proximate object, etc.). The touch sensor 542 can be operatively coupled to the touch chip 540, such as by being coupled to processor 544, which can be configured to perform removal of the display noise. Although FIG. 5B illustrates the touch sensor 542 as being coupled to the processor 546 through processor 544, in some examples, the touch sensor 542 is directly coupled to the processor 546. Moreover, in some examples, processors 544 and/or 546 are actually a plurality of processors. In some examples, processor 544 and processor 546 are the same processor.

Processor 544 can perform part or all of a machine learning method for removing noise (e.g., deterministic display noise) from the touch data provided by the touch sensor 542. As shown in FIG. 5B, in some examples, processor 544 of the touch chip 540 is operatively coupled to processor 538 of the display chip. Thus, in some examples, the processor 544 of the touch chip can receive touch data from touch sensor 542 and image data, feature extraction data, or an output representing part of the display noise removal from processor 538 as described above.

In some examples, the touch chip 540 further includes processor 546, which can be configured to perform additional noise removal on the touch data. In some examples, the touch sensor 542 can sense noise from multiple sources other than the display, such as noise caused by a power system of the electronic device, parasitic capacitance between the touch circuitry and other circuitry of the electronic device, or noise caused by poor grounding of a proximate object. For example, drops of water on the surface of the touch screen can couple electrical charge to the touch electrodes, thereby causing noise in the touch data. One or more processors 546 can execute one or more algorithms to reduce or remove noise from sources other than the display.

In some examples, the power consumption, speed, complexity, and/or performance of the noise removal can depend on how execution of the noise removal method is split between processor 538 of the display chip 530 and processor 544 of the touch chip 540. Exemplary machine learning methods of estimating and removing deterministic display noise from touch data will now be described with reference to FIGS. 6A-6E. These methods can be performed by processors 538 and 544 in some examples.

FIGS. 6A-6E illustrate block diagrams of exemplary machine learning methods of estimating and removing noise from touch data according to some examples of the disclosure. In some examples, the machine learning method(s) can be used to estimate noise, such as deterministic display noise, included in touch data sensed by a touch screen. Deterministic display noise can be dependent on the image displayed by the touch screen, for example. In some examples, the machine learning model can be trained to predict deterministic display noise from image data.

Figure 6A:
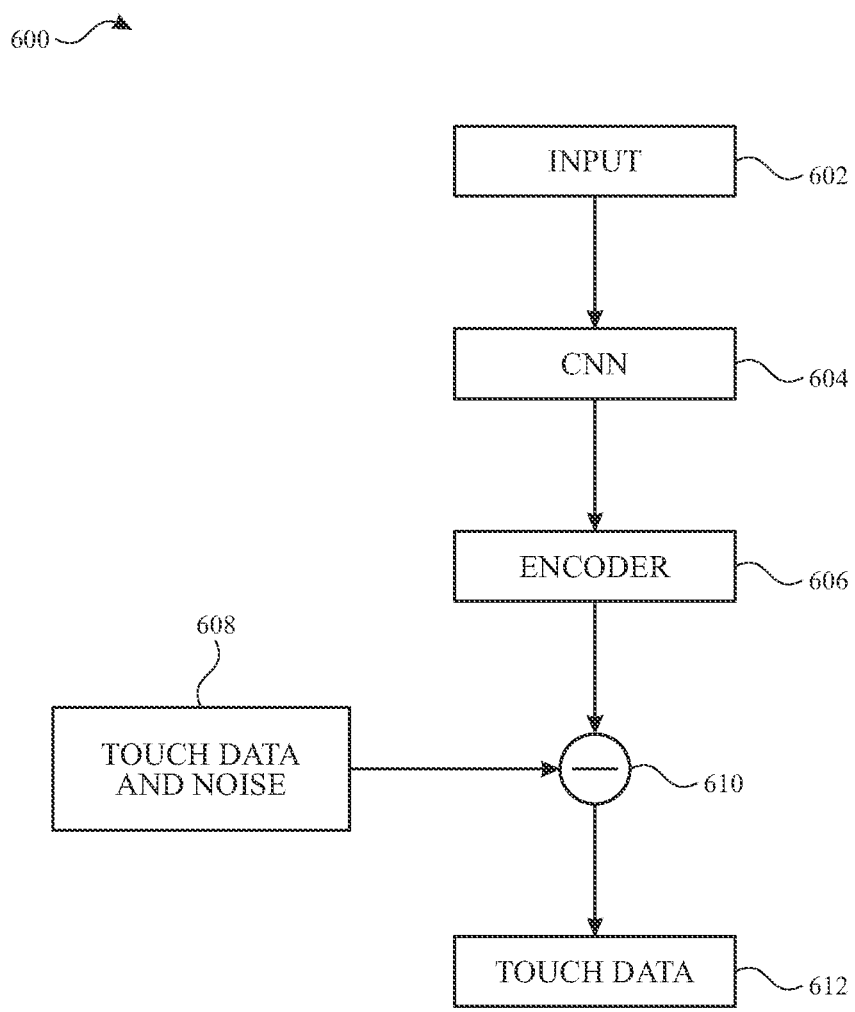
FIGS. 6A-6E illustrate block diagrams of exemplary machine learning methods of estimating and removing noise from touch data according to some examples of the disclosure.

FIG. 6A illustrates a block diagram 600 of a machine learning method that uses convolutional neural network to estimate and remove noise from touch data. The machine learning method illustrated in FIG. 6A can be performed at an electronic device according to one or more of the examples described above with reference to FIGS. 1A-5B.

The machine learning method illustrated in FIG. 6A can include one or more CNN layers 604. In some examples, the CNN layers 604 can each include a plurality of nodes. The nodes of a respective layer can be fully connected to all of the nodes in adjacent layers. In some examples, the first CNN layer of the CNN layers 604 can receive an input 602 that can be the image pixels 532 or the image data or feature extraction generated by processor 538. In some examples, the CNN layers 604 can be trained to output an "image" of the deterministic display noise in response to receiving the input 620 image data. In some examples, one or more CNN layers 604 can be housed on the display chip 530 or, in some examples, one or more CNN layers 604 can be housed on the touch chip 340. For example, some of the CNN layers 604 are on each of the display chip 530 and touch chip 540, all of the CNN layers 604 are on the display chip 530, or all of the CNN layers 604 are on the touch chip 540.

In some examples, the CNN layers 604 can output one or more features of the image or features of the deterministic display noise and provide this output to the encoder 606. The encoder 606 can include a fully connected layer that can extract the features output by the CNN layers 604 to produce an output that includes an array the same size as the array of touch data. For example, the touch data can have the same dimensions as the touch nodes of the touch screen. In some examples, the CNN layers 604 produce an output that has different dimensions from the dimensions of the touch data and the encoder 606 can accept the output from the CNN layers 604 and produce an output with different dimensions that match the dimensions of the touch data.

In some examples, the noise in a respective region of the touch screen can depend on the displayed image not only in the respective region of the touch screen, but in other regions of the touch screen as well. The CNN layers 604 may identify localized features but may not identify structured noise caused by the full displayed image. In some examples, the encoder layer 606 can use the features identified by the CNN layers 604 to estimate noise in a way that considers localized features and structured features of the full image to more accurately estimate the deterministic display noise than would be possible using just the CNN layers 604 without the encoder layer 606.

In some examples, all of the CNN layers 604 and the encoder 606 can be housed on the display chip 530 and the display chip 530 can output some or all of the noise removal to the touch chip 540. In some examples, the encoder 606 can be housed on the touch chip 540 and, in some examples, one or more CNN layers 604 can also be housed on the touch chip 540 and one or more CNN layers can be housed on the display chip 530. In some examples, all of the CNN layers 604 and the encoder layer 606 are housed on the touch chip 540.

In some examples, the encoder layer 606 can output an estimation of the deterministic display noise, which can be subtracted (e.g., via a function represented by subtractor 610, the function being executed by a processor, for example) from the touch data and noise 608 sensed by the touch screen (e.g., touch data 502 and noise 504 output by touch screen 506 in FIG. 5A). In some examples, the subtraction can be performed by the touch chip 540. In some examples, the subtraction can be performed by the display chip 530 (and, optionally, all CNN layers 604 and the encoder 606 are housed on the display chip 530 too). The result of the subtraction can be the touch data 612 with the estimated noise (e.g., deterministic display noise) removed.

Figure 6B:
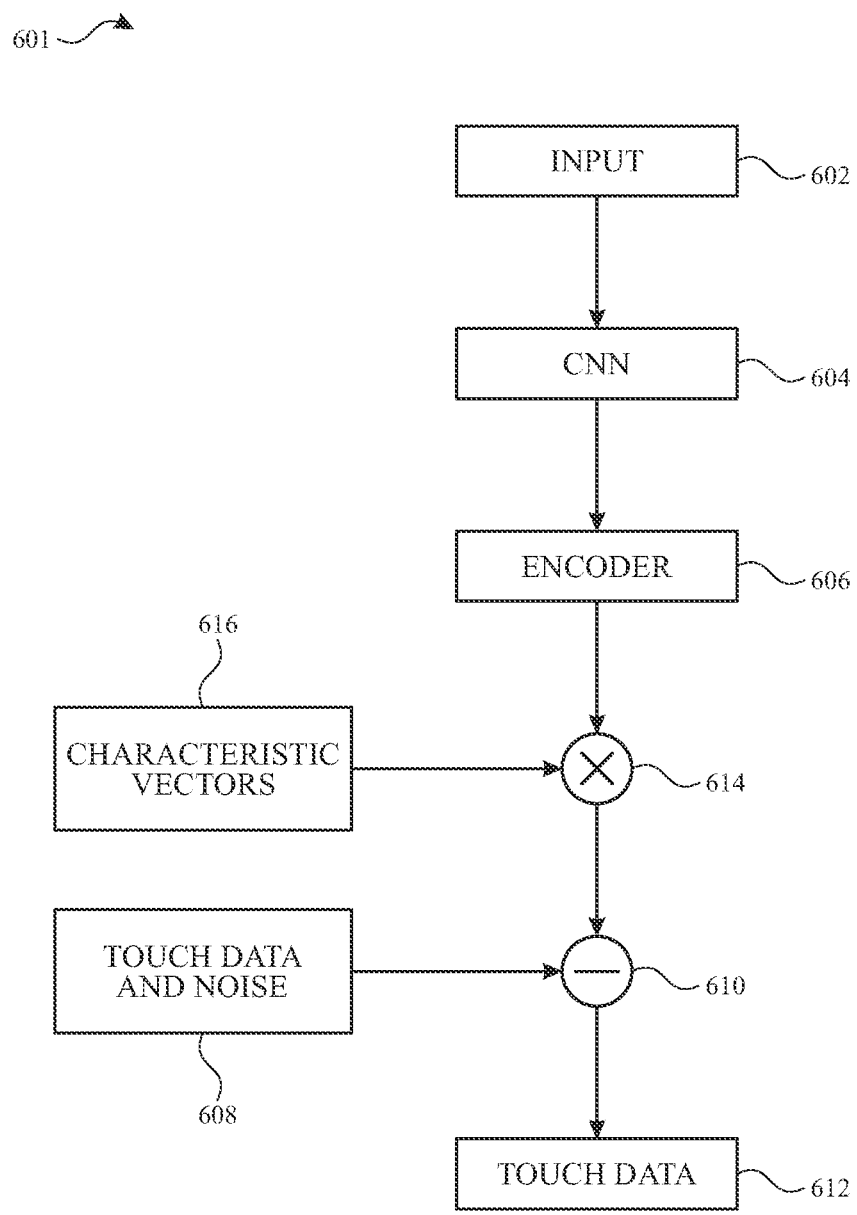

FIG. 6B illustrates a block diagram 601 of a machine learning method that uses convolutional neural network to estimate and remove noise from touch data. Block diagram 601 can be the same as or similar to block diagram 600 described above, except for the differences that will now be described.

In some examples, in addition to using one or more CNN layers 604 and an encoder layer 606 to estimate and remove noise (e.g., deterministic display noise) from touch sensor data, an electronic device can leverage one or more characteristic vectors 616 of display noise to improve the complexity, accuracy, time, or another characteristic of the noise removal algorithm.

As described above, in some examples, the touch data can be described as an array or an image of touch with a signal or noise value for each point in the array or image (e.g., represented by touch nodes). An image of noise (e.g., deterministic display noise) can similarly be described as being an array or image of data. In some examples, each spatial row or spatial column of noise can be a linear combination of characteristic vectors that are unique to the particular electronic device and calculated for each individual electronic device before shipping from the manufacturing facility, for example.

In some examples, during a calibration process, the electronic device can display a predetermined series of images and the resulting noise (e.g., deterministic display noise) at the touch screen can be measured. In some examples, the noise data can be analyzed using singular value decomposition. Singular value decomposition can be performed for each frame of noise data or all of the noise data can be concatenated, or otherwise combined and singular value decomposition can be performed on the entire noise data set. In some examples, characteristic vectors of the noise can be computed from the singular value decomposition of the noise data. The characteristic vectors are vectors that can be linearly combined to represent any noise pattern observed during the calibration process—thus, the characteristic vectors can be linearly combined to represent a large portion of display-to-touch noise patterns that are expected to occur at the respective electronic device unit. After computing the characteristic vectors of noise for a respective electronic device, the characteristic vectors can be stored in a memory of the electronic device for future use when estimating and removing noise (e.g., deterministic display noise) from the touch data.

Returning to FIG. 6B, in some examples, the encoder 606 of the electronic device can output one or more coefficients for characteristic vector of noise and the characteristic vectors can be scaled (e.g., using an algorithm (represented by multiplier 614) executed by a processor) by the coefficients and linearly combined to estimate the noise in the touch data. In some examples, the encoder can output a coefficient for each characteristic vector for each row or column of touch data and the linear combination can be performed for each row or column of touch data. Thus, the result of the linear combination, represented by the output of multiplier 614, can be an estimate for the noise (e.g., deterministic display noise) in the touch data, for example. In some examples, the estimate of the noise data output by multiplier 614 can be subtracted from the touch data and noise 608 to calculate the touch data 612 with the noise removed in a manner similar to the manner described above with reference to FIG. 6A.

Figure 6C:
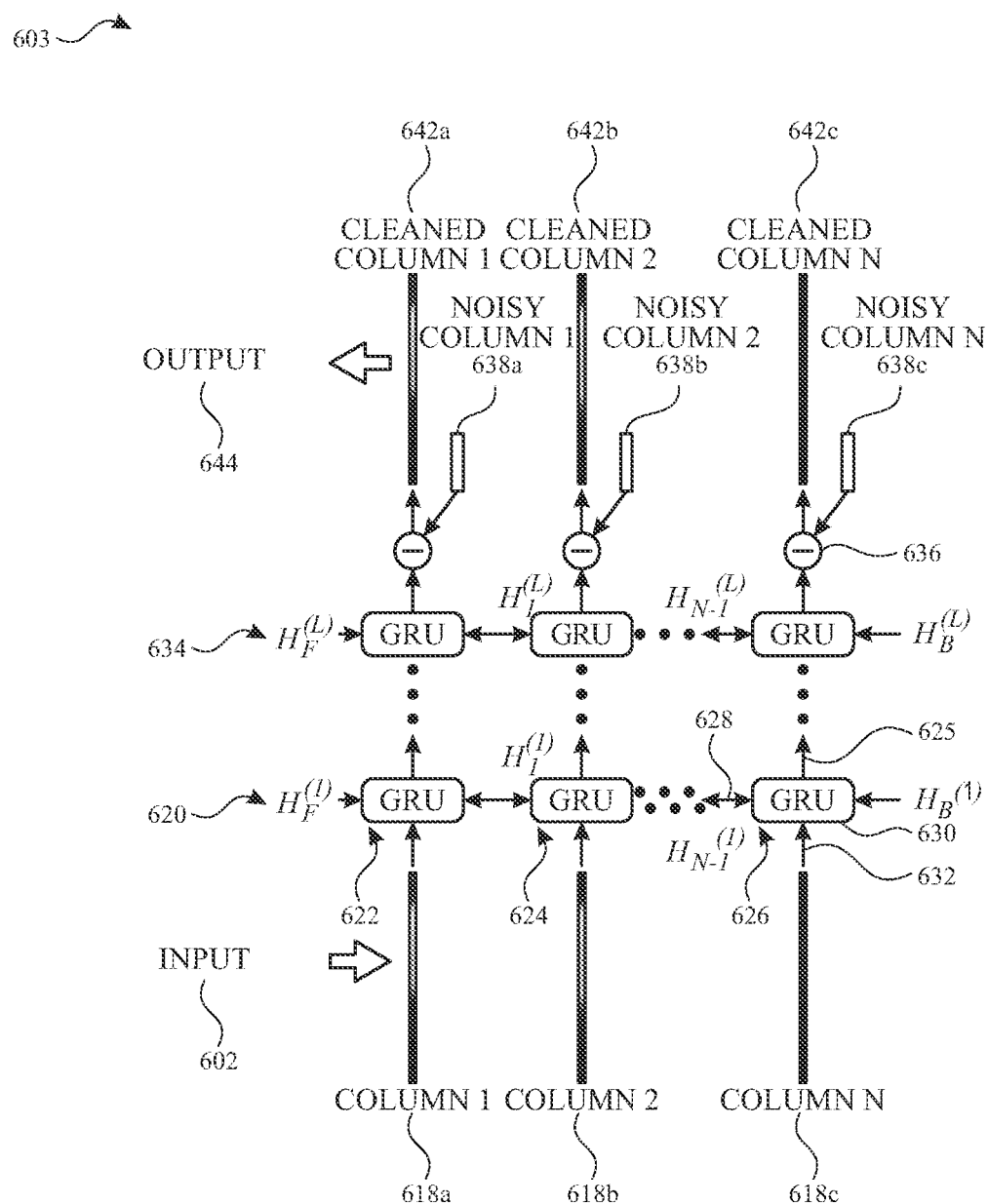

FIG. 6C illustrates a block diagram 603 of a machine learning method that can be used to estimate and remove noise (e.g., deterministic display noise) from touch data sensed by a touch screen according to some examples. As shown in block diagram 603, in some examples, gated recurrent units (GRUs) can be used to estimate the noise (e.g., deterministic display noise) in the touch data sensed by the touch screen. The first layer 620 of GRUs can accept an input 602, which can include one or more of image data, feature extraction, or an output of part of the noise removal 538 provided by display chip 530. In some examples, some of the GRUs are housed on the display chip 530 and/or some of the GRUs are housed on the touch chip 540, including examples where all of the GRUs are housed on one of the display chip 530 or touch chip 540. In some examples, the input to the first layer 620 of GRUs is the image data arranged into vectors, such as rows or columns equal to the number of rows or columns of touch data. In some examples, the image can have a different (e.g., larger) number of rows and/or columns of image pixels than the size of the touch data. The electronic device can compress the image data, such as by computing a mean or median value (e.g., gray-scale value, or each of red, green, and blue values, or display brightness, or luminosity) of groups of pixels that correspond to each touch node of the touch screen.

Block diagram 603 illustrates a GRU-based algorithm that can include a plurality of channels 622, 624, and 626, with one channel per column of touch data, for example. In some examples, the channels are communicatively arranged in the same way the columns of the touch screen are spatially arranged. For example, the channel 622 that receives the leftmost column 618a of image data as input is in communication with the channel 624 that receives the column 618b of image data that is directly to the right of the leftmost column 618a of touch data. More generally, a respective channel that receives a respective column of image data as input is in communication with the channel(s) that receive as input column(s) of data that are directly adjacent to the respective column. Thus, for example, if the touch data includes n columns of data, the GRU-based algorithm can have n channels 622-626. In some examples, the spatial correlation of the algorithm can be advantageous for removing deterministic display noise because deterministic display noise can have a columnar structure. For example, one or more columns may have a relatively high amount of deterministic display noise, with the magnitude of deterministic display noise of the other columns being proportional to the proximity of those other columns to the columns with the maximum deterministic display noise.

In some examples, each channel 622-626 can have a predetermined number of nodes 630, the number of units per channel 622-626, or layers, being denoted by "L". Each node 630 can accept an input 632 and a state 628 and produce an output 625 and a state 628. In some examples, the first layer can accept as input a vector with the same size as the number of measurements in each column of touch data (e.g., the number of values in each column of image data), and the final layer 634 can provide as output a vector with the same size as the number of measurements in each column. The layers in the middle can have inputs and outputs with different sizes, however. For example, the size of the vectors can be compressed in the middle layers of the GRU-based algorithm to improve computational efficiency. As another example, the vectors in the middle of the GRU-based algorithm can be augmented, if such augmentation is advantageous. In some examples, some middle layers have compressed vectors and other middle layers have augmented vectors. In some examples, all layers input and output vectors having the same size as the columns of touch data.

In some examples, the GRU-based algorithm can be spatially recurrent. As described above, each channel 622-626 can accept one column 618 of touch data as an input and output a column 642 of estimated noise or estimated touch data with the noise removed, for example. In some examples, nodes 630 within the same layer (e.g., layer 620 or 634) can exchange states 628, thus providing each channel 622-626 with information related to the adjacent columns of touch data. Initial states $h_f^{(1)} \ldots h_f^{(L)}$ and $h_b^{(1)} \ldots h_b^{(L)}$ can be set to 0 or some other predetermined value or can be the characteristic vectors of noise described above, for example. In some examples, the GRU-based algorithm is a bi-directional GRU in that nodes 630 within each layer transfer states to both neighboring cells 630. For example, initial states $h_f^{(1)} \ldots h_f^{(L)}$ can be passed along each layer in a first direction (e.g., from left to right, as shown in FIG. 6C) and initial states $h_b^{(1)} \ldots h_b^{(L)}$ can be passed along each layer in the opposite direction (e.g., from right to left, as shown in FIG. 6C). In some examples, the initial states are passed in one direction, then the other, and then the outputs of both directions are summed, averaged, or concatenated. The outputs 625 of the nodes 630 of the final layer 634 of the algorithm, which can represent the estimated deterministic display noise in each column of touch data, can be combined with columns of touch data 638a-c at subtractor 636 to subtract the estimated noise from the touch data and noise sensed by the touch screen. Thus, in some examples, each channel 622-626 can output a column 642a-c of touch data with noise (e.g., deterministic display noise) removed (or significantly reduced).

Figure 6D:
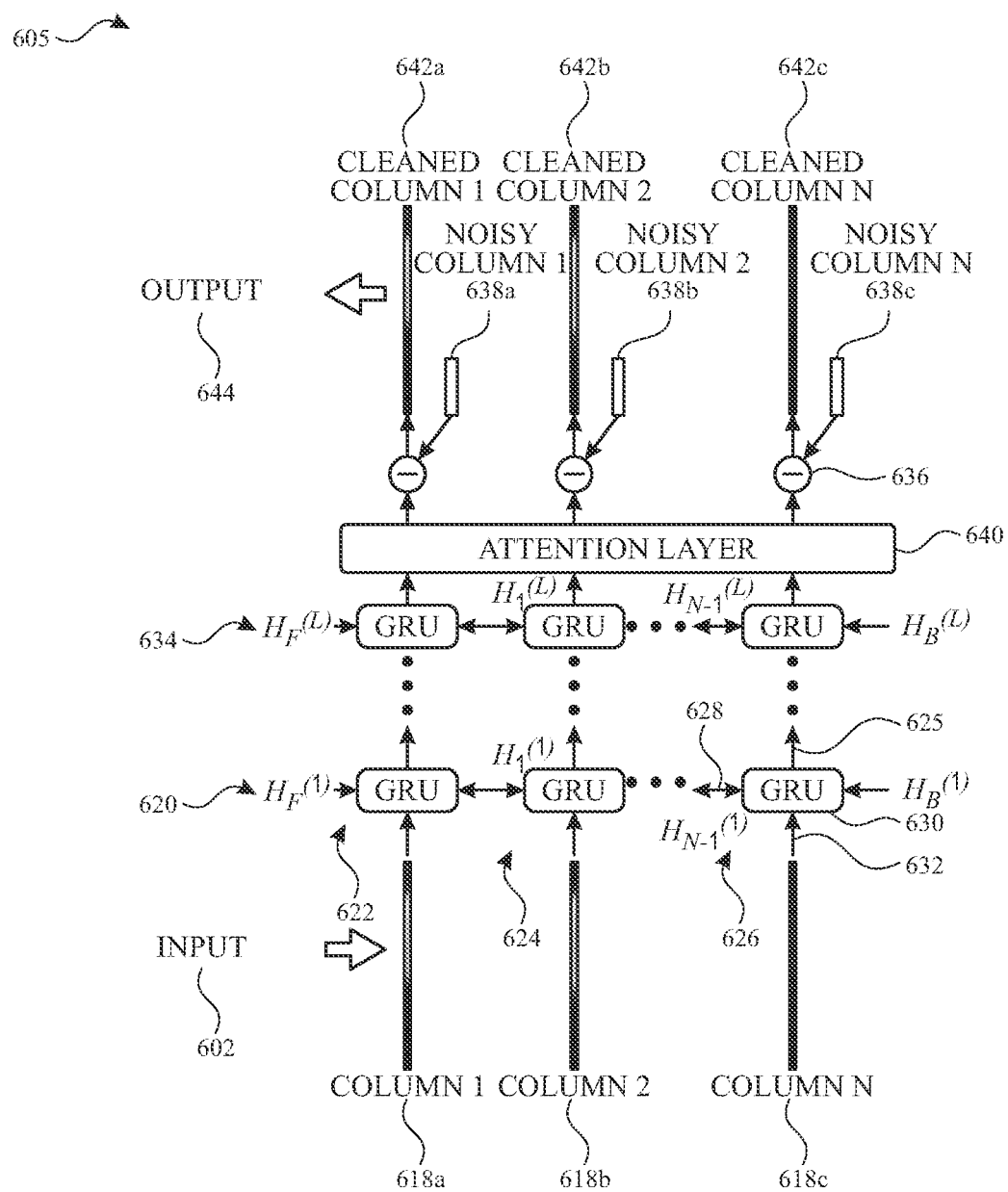

FIG. 6D illustrates a block diagram 605 of a machine learning method that can be used to estimate and remove noise (e.g., deterministic display noise) from touch data sensed by a touch screen according to some examples. The algorithm illustrated by block diagram 605 can include the same components as the algorithm described above with reference to FIG. 6C with the addition of attention layer 640. In some examples, the algorithm illustrated in FIG. 6D can be implemented using one or more of the touch chip 530 or the display chip 540.

In some examples, attention layer 640 can be generated using the characteristic vectors of the noise described above. The predetermined number of most-relevant characteristic vectors can be concatenated and provided to a calibration GRU algorithm that is similar to GRU algorithm illustrated in FIG. 6C but does not include subtractors 636. Thus, the calibration algorithm can provide an estimation of characteristic images of the electronic device, for example. In some examples, the estimation of the characteristic images can be used to create an attention layer 640. The attention layer 640 can accept as input the outputs 625 of the final layer 634 of the algorithm in FIG. 6D and provide its outputs to subtractors 636. Thus, the outputs of the attention layer 640 can be the estimation of noise (e.g., deterministic display noise) based on the image data provided as the input 602 to the algorithm. In some examples, the attention layer 640 is not the final layer in the GRU-based algorithm and instead accepts the output of a layer other than the final layer 634 and provides its output to a subsequent layer of GRU nodes 630. In some examples, the attention layer 640 applies one or more scaling factors to one or more features identified by the rest of the algorithm to provide a more accurate estimation of noise (e.g., deterministic display noise) and, thus, improved removal of noise from the touch data.

Figure 6E:
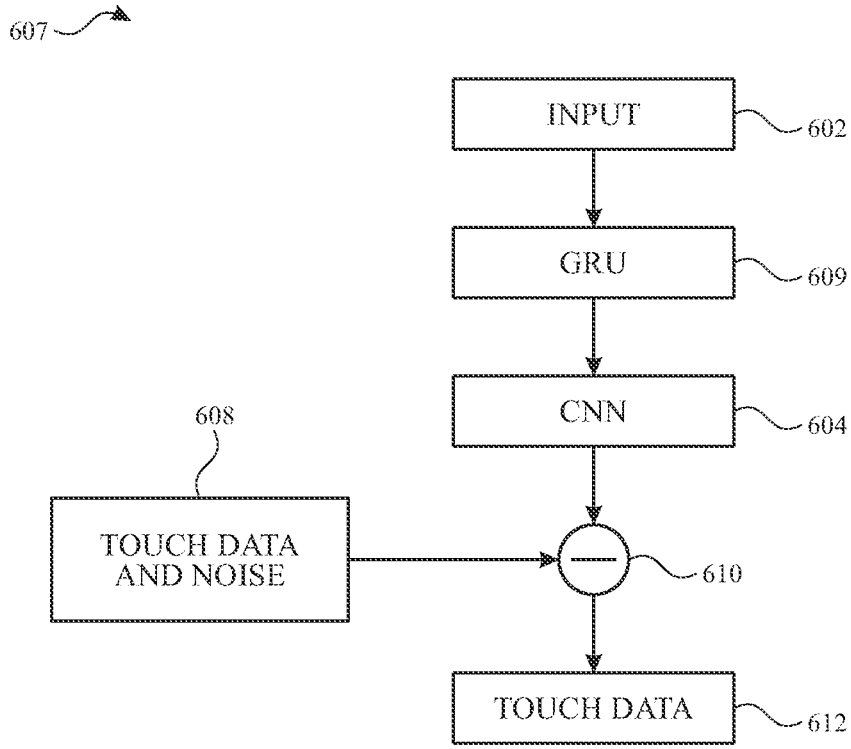

In some examples, a noise estimation and removal algorithm can include GRU layers and CNN layers. FIG. 6E illustrates an exemplary block diagram 607 of a noise estimation and removal algorithm according to some examples of the disclosure.

In some examples, the input 602 to the noise removal algorithm can be image data, feature extraction, or part of the noise removal provided by processor 538. In some examples, at least part of the algorithm can be executed by one or more of the display chip 530 or the touch chip 540 of the electronic device.

In some examples, the input 602 can be provided to a GRU stage 609 of the algorithm. The GRU stage 609 can be the same as or similar to either of the algorithms described above with reference to FIGS. 6C and 6D. In some examples, the GRU stage 609 does not include subtractors 636 and the outputs of the final GRU layer 634 of the algorithm (or of attention layer 640) can be provided to CNN layer 604. In some examples, the CNN stage 604 is the same as or similar to the CNN layers 604 described above with reference to FIGS. 6A-6B. FIG. 6E further includes a subtractor 610 that can subtract the estimated noise (e.g., deterministic display noise) from the touch data and noise 608 sensed by the touch screen of the electronic device. In some examples, subtractor 610 represents an algorithm executed by a processor (e.g., a processor of display chip 530 or touch chip 540). In some examples, an algorithm that uses both a GRU stage 609 and a CNN stage 604 can also include the technique of generating coefficients with the encoder 606 to be multiplied with the characteristic vectors 616 of noise in a manner similar to the manner described above with reference to FIG. 6B.

Figure 7:
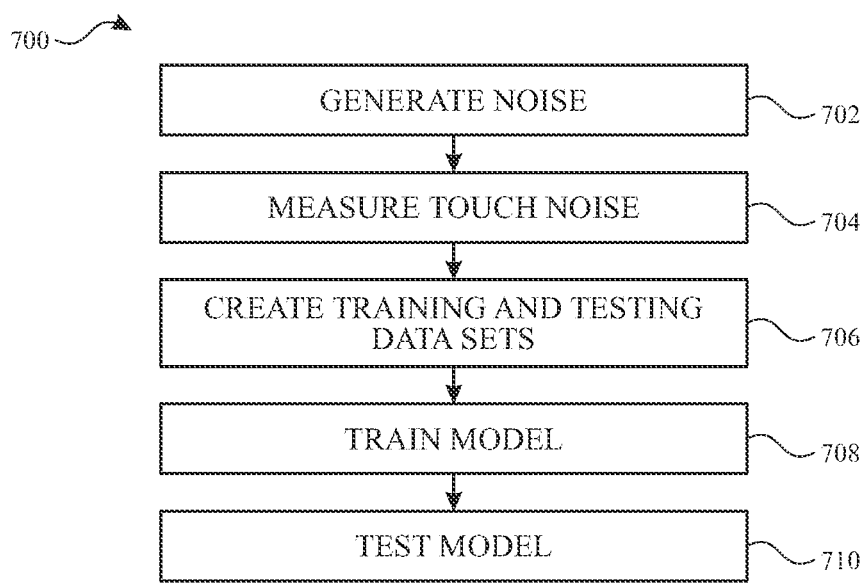
FIG. 7 illustrates an exemplary process for training a machine learning model for removing noise from touch data according to some examples of the disclosure.

FIG. 7 illustrates an exemplary process 700 for training a machine learning model for removing noise from touch data according to some examples of the disclosure. In some examples, process 700 can be used to train and test one of the algorithms described above with reference to FIGS. 6A-6E. Process 700 can be performed by the manufacturer and/or designer of an electronic device to create a model for use in all units of the same design of electronic device. The machine learning algorithm for removing or reducing noise can have a number of parameters that can be set through training the algorithm according to process 700, for example.

At 702, noise data can be generated. The noise data can be generated by displaying a series of images using the touch screen while no objects are proximate to or touching the touch screen, for example. In some examples, the displayed images can generate noise (e.g., deterministic display noise) that can be sensed by the touch screen of the electronic device according to operation 704.

At 704, the touch screen can sense touch signals, which can be noise (e.g., deterministic display noise) caused by the operation of the display of the touch screen. In some examples, the displayed images and the noise generated by the respective displayed images can be stored in association with each other. In some examples, operations 702 and 704 can occur simultaneously.

At 706, a training data set and a testing data set can be created from the noise measured at 704. A number of noise data sets can be used for the purpose of training and the remaining data sets can be used to test the model. Preserving the association of the noise and the displayed images that generated the noise can make it possible to train and test the model at 708 and 710.

At 708, the model can be trained. To train the model, the model can be provided with an example of image data and the noise generated by the respective image data. Several examples can be provided to the model. Because the noise for each example image is provided to the model, the model can tune its parameters to construct a model that accurately estimates the noise in each example by checking its performance for each example.

At 710, the model can be tested. To test the model, the model can be provided with image data and then the model's output can be compared to the noise data collected for the input image data. The differences between the model's output and the measured noise data for each image can be compared to evaluate the accuracy of the model.

Once the model has been trained and tested, it can be installed on each unit of a respective model of electronic device. In some examples, the training and testing data can be collected from a number of units, thus generating a model with good performance for other units not included in the test group (e.g., units to be shipped to customers). That said, the accuracy of the model can be improved either by repeating process 700 for each unit (where noise is generated 702 and measured 704 for each unit for use in training 708 and testing 710 each unit) or by performing a calibration procedure to tune the model built using test units, for example. In some examples, the latter approach can save time and money and may be preferable to the former approach.

Figure 8:
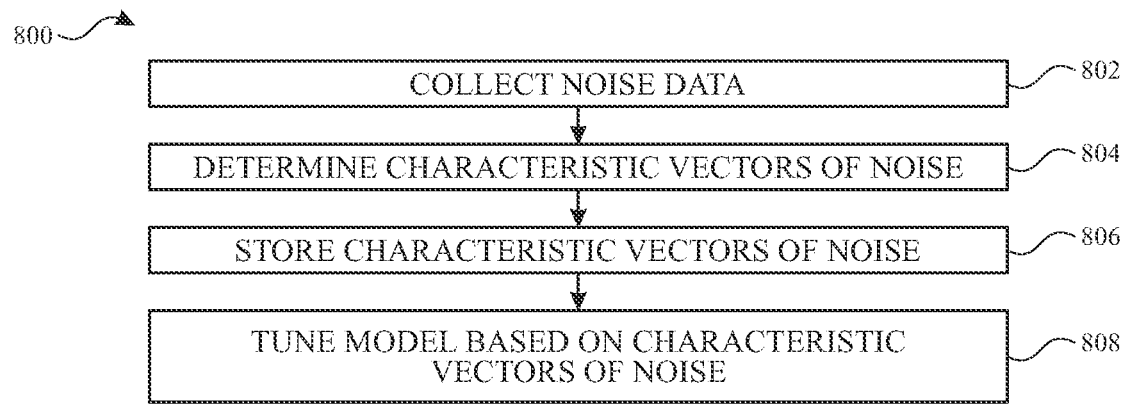
FIG. 8 illustrates an exemplary process for calibrating a noise-removal model for a respective electronic device unit according to some examples of the disclosure.

FIG. 8 illustrates an exemplary process 800 for calibrating a noise-removal model for a respective electronic device unit according to some examples of the disclosure. Process 800 can be used to calibrate a model, such as one of the models described above with reference to FIGS. 6A-6E. In some examples, process 800 can be performed before the electronic device unit is shipped to the customer (e.g., at the factory) or can be performed on-demand in response to a user input.

At 802, noise data can be collected. For example, while there are no objects touching or proximate to the touch screen, the electronic device can be powered on and can display a number of calibration images while touch data is collected. The touch data can be stored for further use. In some examples, the touch data can include noise (e.g., deterministic display noise).

At 804, a plurality of characteristic vectors indicative of the noise data can be calculated. For example, the noise data can be analyzed using singular value decomposition. Singular value decomposition can be performed for each frame of noise data or all of the noise data can be concatenated, or otherwise combined and singular value decomposition can be performed on the entire noise data set. In some examples, characteristic vectors of the noise can be computed from the singular value decomposition of the noise data. The characteristic vectors are vectors that can be linearly combined to represent any noise pattern observed during the calibration process—thus, the characteristic vectors can be linearly combined to represent a large portion of noise patterns that are expected to occur at the respective electronic device unit.

At 806, the characteristic vectors of noise can be stored. In some examples, the relevance of the characteristic vectors can widely vary. Thus, the characteristic vectors can be ranked according to relevance and a predetermined number (e.g., 4, 5, 6, etc.) of most-relevant characteristic vectors can be stored. In some examples, however, all characteristic vectors are stored.

At 808, the algorithm can be tuned using the characteristic vectors (e.g., the predetermined number of most-relevant characteristic vectors) as described above. Tuning can be accomplished in a number of ways. Characteristic vectors can be used as initial states for one or more layers of a GRU stage, characteristic vectors can be concatenated with the display data and the concatenation can be used as the input 602 to the model, the characteristic vectors can be used to construct attention layer 640, as described above with reference to FIG. 6D, and/or the characteristic vectors can be multiplied by coefficients determined by the machine learning algorithm, as described above with reference to FIG. 6B.

In some examples, the characteristic vectors can be used as the initial states of one or more GRU-based algorithms, such as the algorithms described above with reference to FIGS. 6C-6E. For example, one characteristic vector can be used for each layer of the GRU stage of the algorithm. As another example, one characteristic vector can be used for each layer of the GRU stage of the algorithm until all saved characteristic vectors have been used. For example, if 4 characteristic vectors are stored and the model has 6 layers, characteristic vectors can be used as the initial states of the first four layers of the model and the initial state of the last two layers can be set to a predetermined value, such as 0. As another example, all of the stored characteristic vectors can be concatenated and provided to the first layer 620 as the initial state and the initial state of all other layers can be set to a predetermined value, such as 0.

In some examples, the characteristic vectors can be included in the input 602 provided to one of the algorithms described above with reference to FIGS. 6A-6E. For example, the display data and all stored characteristic vectors can be concatenated and the concatenated input 602 can be provided to the model.

Figure 9:
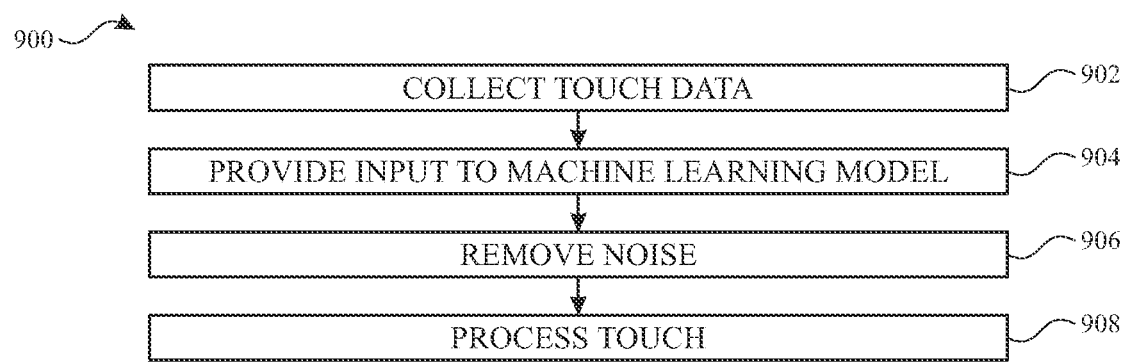
FIG. 9 illustrates an exemplary process of processing touch input at an electronic device according to some examples of the disclosure.

FIG. 9 illustrates an exemplary process 900 of processing touch input at an electronic device according to some examples of the disclosure. Process 900 can be performed with one or more examples described above with reference to FIGS. 1-8.

At 902, touch data can be collected. Collecting touch data can include sensing touch at a touch screen (e.g., touch screen 124, 126, 128, 130, 132, 220, 400, or 402) or touch sensor panel 134 or 138 according to one or more examples described with reference to FIGS. 2-4.

At 904, an input that includes display data can be provided to a machine learning model, such as one of the algorithms described above with reference to FIGS. 6A-6E. As described above, the input can further include one or more characteristic vectors of noise of the electronic device unit.

At 906, the machine learning model can remove noise from the touch data. For example, the algorithm can estimate noise (e.g., deterministic display noise) and subtract it from the touch data sensed by the touch screen.

At 908, the touch data with the noise removed can be processed. With the noise removed or reduced, the touch data can be used to determine the size, shape, and location of one or more objects touching or hovering near the touch screen. The electronic device can perform a variety of functions in response to detecting touching or hovering objects or gestures performed with touching or hovering objects. For example, in response to detecting a tap gesture in a respective region of a user interface displayed on the touch screen, the electronic device can perform a function associated with the respective region.

Therefore, according to the above, some examples of the disclosure are directed to a method comprising: at an electronic device including a touch screen: obtaining first touch data, sensed using one or more touch sensing electrodes of the touch screen, wherein the first touch data includes data representing noise; inputting, to a machine learning algorithm, image data associated with an image displayed at a same time the first touch data was obtained; obtaining estimated noise by estimating, via the machine learning algorithm, the noise based on the image data; and removing the estimated noise from the first touch data to obtain second touch data. Additionally or alternatively, in some examples, the machine learning algorithm includes one or more of a convolutional neural network layer, a fully connected layer, or a gated recurrent unit layer. Additionally or alternatively, in some examples, obtaining the estimated noise includes: prior to obtaining the first touch data, displaying, via the touch screen, one or more images while sensing third touch data at the touch screen, the third touch data including data representing noise caused by display circuitry of the touch screen; calculating a plurality of characteristic vectors that, when linearly combined, result in the noise included in the third touch data; and storing, in a memory of the electronic device, the characteristic vectors. Additionally or alternatively, in some examples, obtaining the estimated noise includes: estimating a plurality of coefficients; and scaling the plurality of characteristic vectors with the coefficients and linearly combining the scaled characteristic vectors, wherein the linear combination of the characteristic vectors scaled with the plurality of coefficients is the estimated noise. Additionally or alternatively, in some examples, the machine learning algorithm includes one or more gated recurrent units, and initial states of the one or more gated recurrent units are the characteristic vectors. Additionally or alternatively, in some examples, the method further comprises after obtaining the second touch data, performing an action with the electronic device in accordance with the second touch data. Additionally or alternatively, in some examples, the noise included in the first touch data is caused by display circuitry of the touch screen. Additionally or alternatively, in some examples, the first touch data includes the noise and data indicative of one or more objects proximate to the touch screen, and the second touch data includes the data indicative of the one or more objects proximate to the touch screen and excludes the noise.

Some examples of the disclosure are directed to an electronic device comprising: a touch screen; and one or more processors storing instructions that, when executed, cause the electronic device to perform a method comprising: obtaining first touch data, sensed using one or more touch sensing electrodes of the touch screen, wherein the first touch data includes data representing noise; inputting, to a machine learning algorithm, image data associated with an image displayed at a same time the first touch data was obtained; obtaining estimated noise by estimating, via the machine learning algorithm, the noise based on the image data; and removing the estimated noise from the first touch data to obtain second touch data. Additionally or alternatively, in some examples, the machine learning algorithm includes one or more of a convolutional neural network layer or a gated recurrent unit layer. Additionally or alternatively, in some examples, obtaining the estimated noise includes: prior to obtaining the first touch data, displaying, via the touch screen, one or more images while sensing third touch data at the touch screen, the third touch data including data representing noise caused by display circuitry of the touch screen; calculating a plurality of characteristic vectors that, when linearly combined, result in the noise included in the third touch data; and storing, in a memory of the electronic device, the characteristic vectors. Additionally or alternatively, in some examples, obtaining the estimated noise includes: estimating a plurality of coefficients; and scaling the plurality of characteristic vectors with the coefficients and linearly combining the scaled characteristic vectors, wherein the linear combination of the characteristic vectors scaled with the plurality of coefficients is the estimated noise. Additionally or alternatively, in some examples, the machine learning algorithm includes one or more gated recurrent units, and initial states of the one or more gated recurrent units are the characteristic vectors. Additionally or alternatively, in some examples, the method further comprises: after obtaining the second touch data, performing an action in accordance with the second touch data. Additionally or alternatively, in some examples, the noise included in the first touch data is caused by display circuitry of the touch screen. Additionally or alternatively, in some examples, the first touch data includes the noise and data indicative of one or more objects proximate to the touch screen, and the second touch data includes the data indicative of the one or more objects proximate to the touch screen and excludes the noise.

Some examples of the disclosure are directed to a non-transitory computer-readable medium comprising instructions that, when executed by one or more processors of an electronic device comprising a touch screen, cause the electronic device to perform a method comprising: obtaining first touch data, sensed using one or more touch sensing electrodes of the touch screen, wherein the first touch data includes data representing noise; inputting, to a machine learning algorithm, image data associated with an image displayed at a same time the first touch data was obtained; obtaining estimated noise by estimating, via the machine learning algorithm, the noise based on the image data; and removing the estimated noise from the first touch data to obtain second touch data. Additionally or alternatively, in some examples, the machine learning algorithm includes one or more of a convolutional neural network layer or a gated recurrent unit layer. Additionally or alternatively, in some examples, obtaining the estimated noise includes: prior to obtaining the first touch data, displaying, via the touch screen, one or more images while sensing third touch data at the touch screen, the third touch data including data representing noise caused by display circuitry of the touch screen; calculating a plurality of characteristic vectors that, when linearly combined, result in the noise included in the third touch data; and storing, in a memory of the electronic device, the characteristic vectors. Additionally or alternatively, in some examples, obtaining the estimated noise includes: estimating a plurality of coefficients; and scaling the plurality of characteristic vectors with the coefficients and linearly combining the scaled characteristic vectors, wherein the linear combination of the characteristic vectors scaled with the plurality of coefficients is the estimated noise. Additionally or alternatively, in some examples, the machine learning algorithm includes one or more gated recurrent units, and initial states of the one or more gated recurrent units are the characteristic vectors. Additionally or alternatively, in some examples, the method further comprises after obtaining the second touch data, performing an action with the electronic device in accordance with the second touch data. Additionally or alternatively, in some examples, the noise included in the first touch data is caused by display circuitry of the touch screen. Additionally or alternatively, in some examples, the first touch data includes the noise and data indicative of one or more objects proximate to the touch screen, and the second touch data includes the data indicative of the one or more objects proximate to the touch screen and excludes the noise.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A method comprising:
at an electronic device including a touch screen:
obtaining first touch data, sensed using one or more touch sensing electrodes of the touch screen, wherein the first touch data includes data representing noise;
inputting, to a machine learning algorithm that includes a gated recurrent unit having one or more channels, one or more vectors of image data associated with an image displayed at a same time the first touch data was obtained, the one or more vectors of image data equal in number to the one or more touch sensing electrodes arranged along a same dimension, wherein an input to each of the one or more channels of the gated recurrent unit is one of the one or more vectors of image data;
obtaining estimated noise by estimating, via the machine learning algorithm, the noise based on the image data; and
removing the estimated noise from the first touch data to obtain second touch data.

2. The method of claim 1, wherein the machine learning algorithm includes one or more of a convolutional neural network layer or a fully connected layer.

3. The method of claim 1, wherein obtaining the estimated noise includes:
prior to obtaining the first touch data, displaying, via the touch screen, one or more images while sensing third touch data at the touch screen, the third touch data including data representing noise caused by display circuitry of the touch screen;
calculating a plurality of characteristic vectors that, when linearly combined, result in the noise included in the third touch data; and
storing, in a memory of the electronic device, the characteristic vectors.

4. The method of claim 3, wherein obtaining the estimated noise includes:
estimating a plurality of coefficients; and
scaling the plurality of characteristic vectors with the coefficients and linearly combining the scaled characteristic vectors, wherein the linear combination of the characteristic vectors scaled with the plurality of coefficients is the estimated noise.

5. The method of claim 3, wherein:
an initial state of the gated recurrent unit is the characteristic vectors.

6. The method of claim 1, further comprising:
after obtaining the second touch data, performing an action with the electronic device in accordance with the second touch data.

7. The method of claim 1, wherein the noise included in the first touch data is caused by display circuitry of the touch screen.

8. The method of claim 1, wherein:
the first touch data includes the noise and data indicative of one or more objects proximate to the touch screen, and
the second touch data includes the data indicative of the one or more objects proximate to the touch screen and excludes the noise.

9. An electronic device comprising:
a touch screen; and
one or more processors storing instructions that, when executed, cause the electronic device to perform a method comprising:
obtaining first touch data, sensed using one or more touch sensing electrodes of the touch screen, wherein the first touch data includes data representing noise;
inputting, to a machine learning algorithm that includes a gated recurrent unit having one or more channels, one or more vectors of image data associated with an image displayed at a same time the first touch data was obtained, the one or more vectors of image data equal in number to the one or more touch sensing electrodes arranged along a same dimension, wherein an input to each of the one or more channels of the gated recurrent unit is one of the one or more vectors of image data;
obtaining estimated noise by estimating, via the machine learning algorithm, the noise based on the image data; and
removing the estimated noise from the first touch data to obtain second touch data.

10. The electronic device of claim 9, wherein the machine learning algorithm includes one or more of a convolutional neural network layer or a fully connected layer.

11. The electronic device of claim 9, wherein obtaining the estimated noise includes:
prior to obtaining the first touch data, displaying, via the touch screen, one or more images while sensing third touch data at the touch screen, the third touch data including data representing noise caused by display circuitry of the touch screen;
calculating a plurality of characteristic vectors that, when linearly combined, result in the noise included in the third touch data; and
storing, in a memory of the electronic device, the characteristic vectors.

12. The electronic device of claim 11, wherein obtaining the estimated noise includes:
estimating a plurality of coefficients; and
scaling the plurality of characteristic vectors with the coefficients and linearly combining the scaled characteristic vectors, wherein the linear combination of the characteristic vectors scaled with the plurality of coefficients is the estimated noise.

13. The electronic device of claim 11, wherein:
an initial state of the gated recurrent unit is the characteristic vectors.

14. The electronic device of claim 9, wherein the method further comprises:
after obtaining the second touch data, performing an action in accordance with the second touch data.

15. The electronic device of claim 9, wherein the noise included in the first touch data is caused by display circuitry of the touch screen.

16. The electronic device of claim 9, wherein:
the first touch data includes the noise and data indicative of one or more objects proximate to the touch screen, and
the second touch data includes the data indicative of the one or more objects proximate to the touch screen and excludes the noise.

17. A non-transitory computer-readable medium comprising instructions that, when executed by one or more processors of an electronic device comprising a touch screen, cause the electronic device to perform a method comprising:
obtaining first touch data, sensed using one or more touch sensing electrodes of the touch screen, wherein the first touch data includes data representing noise;
inputting, to a machine learning algorithm that includes a gated recurrent unit having one or more channels, one or more vectors of image data associated with an image displayed at a same time the first touch data was obtained, the one or more vectors of image data equal in number to the one or more touch sensing electrodes arranged along a same dimension, wherein an input to each of the one or more channels of the gated recurrent unit is one of the one or more vectors of image data;
obtaining estimated noise by estimating, via the machine learning algorithm, the noise based on the image data; and
removing the estimated noise from the first touch data to obtain second touch data.

18. The non-transitory computer-readable medium of claim 17, wherein the machine learning algorithm includes one or more of a convolutional neural network layer or a fully connected layer.

19. The non-transitory computer-readable medium of claim 17, wherein obtaining the estimated noise includes:
prior to obtaining the first touch data, displaying, via the touch screen, one or more images while sensing third touch data at the touch screen, the third touch data including data representing noise caused by display circuitry of the touch screen;
calculating a plurality of characteristic vectors that, when linearly combined, result in the noise included in the third touch data; and
storing, in a memory of the electronic device, the characteristic vectors.

20. The non-transitory computer-readable medium of claim 19, wherein obtaining the estimated noise includes:
estimating a plurality of coefficients; and
scaling the plurality of characteristic vectors with the coefficients and linearly combining the scaled characteristic vectors, wherein the linear combination of the characteristic vectors scaled with the plurality of coefficients is the estimated noise.

21. The non-transitory computer-readable medium of claim 19, wherein:
an initial state of the gated recurrent unit is the characteristic vectors.

22. The non-transitory computer-readable medium of claim 17, wherein the method further comprises:
after obtaining the second touch data, performing an action with the electronic device in accordance with the second touch data.

23. The non-transitory computer-readable medium of claim 17, wherein the noise included in the first touch data is caused by display circuitry of the touch screen.

24. The non-transitory computer-readable medium of claim 17, wherein:
the first touch data includes the noise and data indicative of one or more objects proximate to the touch screen, and the second touch data includes the data indicative of the one or more objects proximate to the touch screen and excludes the noise.

* * * * *